(12) United States Patent
Komi et al.

(10) Patent No.: US 8,184,700 B2
(45) Date of Patent: May 22, 2012

(54) IMAGE DECODER

(75) Inventors: Hironori Komi, Tokyo (JP); Yusuke Yatabe, Yokohama (JP); Keisuke Inata, Ebina (JP); Mitsuhiro Okada, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1027 days.

(21) Appl. No.: 12/059,030

(22) Filed: Mar. 31, 2008

(65) Prior Publication Data
US 2009/0034625 A1 Feb. 5, 2009

(30) Foreign Application Priority Data
Jul. 30, 2007 (JP) ................ 2007-197599

(51) Int. Cl.
*H04N 11/02* (2006.01)
(52) U.S. Cl. .................. 375/240.14
(58) Field of Classification Search .......... 370/464–466, 370/498, 535; 375/240, 240.24–240.26
See application file for complete search history.

(56) References Cited

U.S. PATENT DOCUMENTS

| | | | |
|---|---|---|---|
| 6,178,203 B1 * | 1/2001 | Lempel | 375/240.24 |
| 7,386,651 B2 * | 6/2008 | Valmiki et al. | 711/5 |
| 2004/0179619 A1 * | 9/2004 | Tian et al. | 375/240.26 |
| 2007/0047660 A1 * | 3/2007 | Mitani et al. | 375/240.25 |
| 2008/0069244 A1 * | 3/2008 | Yano | 375/240.24 |

FOREIGN PATENT DOCUMENTS

| | | |
|---|---|---|
| JP | 08-307821 | 11/1996 |
| JP | 2000-295616 | 10/2000 |
| JP | 2000-324484 | 11/2000 |
| JP | 2001-86460 | 3/2001 |
| JP | 2004-7154 | 1/2004 |
| JP | 2005-176069 | 6/2005 |
| JP | 2006-014113 | 1/2006 |
| JP | 2007-60487 | 3/2007 |
| JP | 2007-60488 | 3/2007 |

* cited by examiner

*Primary Examiner* — Dmitry H Levitan
(74) *Attorney, Agent, or Firm* — Antonelli, Terry, Stout & Kraus, LLP.

(57) ABSTRACT

The present invention relates to an image decoder which implements high speed image decoding with a low cost and simple configuration. By a stream dividing module, an input video stream is divided in units of frames as a plurality of frame rows for distribution. Each of plural decoders generates decoded images by decoding a distributed frame row. Of the decoded images generated by the decoders, reference images to be referred to when a subsequent frame is decoded is stored in a reference image frame memory. A timing control module receives information about stream distribution from the stream dividing module and controls the respective timings of decoding frames distributed to the decoders.

3 Claims, 3 Drawing Sheets

(a) INPUT STREAM (b) OUTPUT DATA ROW

- - - - → IMAGE REFERENCE FOR DECODING P PICTURES
———→ IMAGE REFERENCE FOR DECODING B PICTURES

IMAGE DECODER

CLAIM OF PRIORITY

The present application claims priority from Japanese application serial no. JP 2007-197599, filed on Jul. 30, 2007, the content of which is hereby incorporated by reference into this application.

BACKGROUND OF THE INVENTION

The present invention relates to image decoders which decode image signals.

Digital recorders and video cameras, available these days on the market, use MPEG or other compression techniques to digitally encode video and audio signals for storage on recording media such as hard disks (HDDs) and optical disks (DVDs). Such a recording apparatus, equipped with a plurality of recording media, for example, a HDD and a DVD, has the recording capability of recording to these media (encode process) and playback capability of playing back them (decode process). In order to allow backup or long-term storage of originally recorded data, it also has the capability of dubbing recorded data between the two media. During this dubbing, it is common to perform transcode processing in order to change the compression rate or because of different compression encoding formats assumed for the respective media. The transcode processing performs re-encoding to converts the encoded format of the original compressed video/audio signal.

For such image recording and playback techniques as mentioned above, high speed operation is needed as the case may be. For example, in the case of transcoding where decoded images are re-encoded, if both decoding and re-encoding are performed faster than real time, it is possible to reduce the time required for the transcoding. This reduces the user's waiting time and therefore improves the usability. Generally, as represented by the ISO/IEC131818-2 standard (commonly referred to as MPEG2 Video), motion images are encoded/compressed by using interframe prediction-based compression/encoding techniques. Therefore, transcoding is required to retain interframe reference relations for processing data.

For example, JP-A-2007-86487 and JP-A-2007-86488 (Patent Documents) disclose an apparatus which performs high speed decode processing by using a plurality of decode chips. According to the above-mentioned Patent Documents, the incoming MPEG stream is divided into slices or other components constituting each frame and distributed between the decode chips where decode processing is performed. In addition, reference images are mutually transferred between the chips so that each chip can use reference images created in the other chip. Thus, it is possible to perform decode processing by shortening the processing time as described therein.

SUMMARY OF THE INVENTION

However, since the stream dividing means for dividing a stream, described in the above-mentioned Patent Documents, requires analyzing the syntax down to such a minor layer as the slice layer within each frame, pre-decode processing is undesirably complicated. In addition, since other standards such as the H.264/AVC (ISO/IEC 14496-10) do not define it mandatory for each MB (macroblock) line to constitute a slice, it may be difficult to find out a convenient dividing boundary for decode processing. In addition, according to these standards, intra-prediction processing is sometimes performed by referring to other MB data within the same frame. In this case, since data reference is made between upper and lower MBs, it is necessary to transfer not only reference image data but also currently decoded frame data between the decode chips. This undesirably complicates the circuit configuration.

It is an object of the present invention to provide a high speed image decoder required to implement high speed image encoding, decoding and transcoding with a low cost and simple configuration.

An image decoder of the present invention comprises: a stream dividing module by which an input video stream is divided in units of frames as a plurality of frame rows for distribution; a plurality of decoders each of which generates decoded images by decoding a frame row distributed from the stream dividing module; a reference image frame memory where of the decoded images generated by the plural decoders, reference images to be referred to when a subsequent frame is decoded is stored; a display image frame memory where the decoded images generated by the plural decoders are accumulated; and an image display output module which outputs the decoded images from the display image frame memory in the order that the images are displayed.

A timing control module may be included, which receives information about stream distribution from the stream dividing module, controls the respective timings of decoding frames distributed to the plural decoders, and provides timing control so that decoding of a distributed frame is started immediately after the reference images to be referred to by the distributed frame are all stored in the reference image frame memory.

The stream dividing module may modify the order of divided frames before distributing the divided frames to the plural decoders so that frames to be used as reference images are received earlier than frames not to be used as reference images.

According to the present invention, it is possible to implement high speed image decode processing with a low cost and simple configuration.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

Embodiments of the present invention will be described below with reference to the drawings.

Embodiment 1

Figure 1:
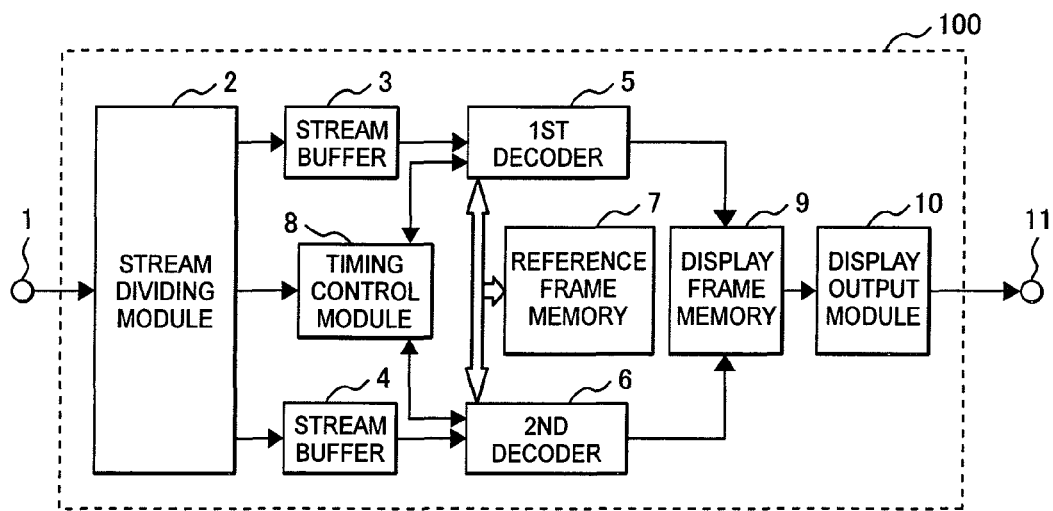
FIG. 1 is a block diagram showing the configuration of an image decoder embodiment according to the present invention.

FIG. 1 is a block diagram showing the configuration of an image decoder 100 according to an embodiment of the present invention. The present embodiment provides an apparatus which decodes a video stream faster than real time.

From a terminal 1, a video elementary stream compressed according to, for example, the MPEG2 Video standard, is incoming. A stream dividing module 2 divides the input video stream into two streams in units of frames (pictures). The divided streams are temporally stored in stream buffers 3 and 4, respectively. A first decoder 5 and a second decoder 6 read out the divided streams (frame rows) respectively from the stream buffers 3 and 4 and perform decode processing on them. That is, decoded images are obtained through a processing sequence including Variable Length Decode (VLD) processing, dequantization, inverse Discrete Cosine Transform (DCT) processing and motion compensation (MC) processing.

Image data to be referred to during decode processing is stored in a reference frame memory 7. Of the images decoded in the first and second decoders 5 and 6, those to be needed in the next decoding are stored there. The reference frame memory 7 has a plurality of storage areas to store plural frame images. The storage areas are updated as necessary so that each frame image is held there only while it may be referred to.

A timing control module 8 is notified by the stream dividing module 2 of which decoder is to process the next frame and then notified by the decoder 5 or 6 of completion of a reference image being created. Then, at the timing when the image to be referred to by the next frame is stored in the reference frame memory 7, the timing control module 8 instructs the decoder 5 or 6 to start decoding the frame.

Image data decoded in the decoders 5 and 6 are accumulated in a display image frame memory 9. An image display output module 10 changes the order of the image data as required by the destination external device (for example, an image display device) before outputting the image data to the external device via a terminal 11.

Thus, in order to raise the decoding speed by parallel processing, the present image decoder embodiment 100 is configured so that the input video stream is divided in units of frames by the stream dividing module 2 into two streams and these streams are processed in parallel by the first and second decoders 5 and 6. Division in distinct units of frames makes the division processing easier because of the clearness of the boundaries. In addition, while reference image data to be referred to for decode processing can be managed easily in units of frames, this scheme can also be applied simply to the H.264/AVC and other formats which involve data reference between upper and lower regions within a frame.

The processing by the first and second decoders 5 and 6 will be described below in detail.

Figure 2:
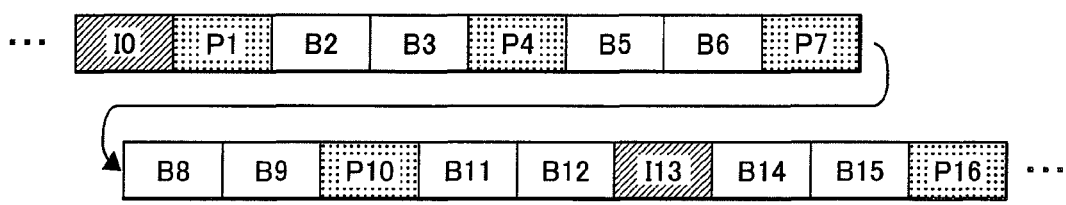
FIGS. 2A and 2B show an input stream and an image data row which is output after decoded.
Figure 2:
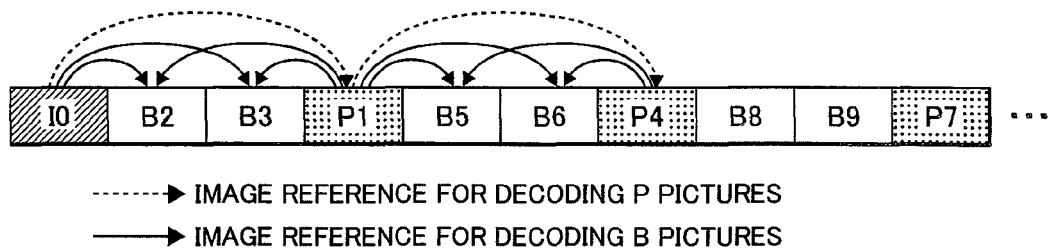

FIGS. 2A and 2B show an input stream and an image data row which is output after decoded.

FIG. 2A shows the order of frames (pictures) in the elementary stream incoming to the terminal 1. Alphabets represent frame types: "I" for an I picture (image encoded within a frame), "P" for a P picture (interframe forward predictive encode image) and "B" for a B picture (bidirectionally predictive encoded image). Numbers indicate the order in which frames are to be processed.

FIG. 2B shows the order of image data in a image data row which is output from the terminal 11 after decoded. Whereas each I picture is decoded solely, decoding each P picture involves reading the last processed I or P picture as a reference image and performing motion compensation. This reference relation is indicated by an arrow (broken line). Decoding each B picture involves reading the last processed two I and/or P pictures as reference images and performing motion compensation. In the decoded image row, the two reference images appear after and before the B picture respectively. Their reference relations are indicated by arrows (solid lines). For example, the B2 picture is decoded by referring to the immediately preceding I0 and P1 pictures in the stream and performing backward prediction from I0 and forward prediction from P1. After each picture is decoded, the display output module 10 re-orders the image data row and outputs it.

Figure 3:
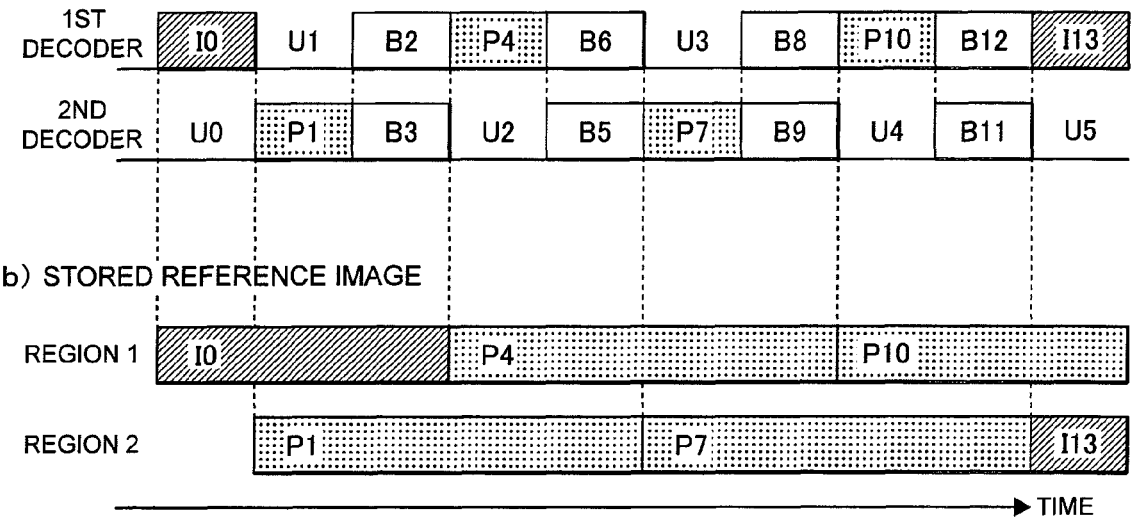
FIGS. 3A and 3B show the operation of a parallel decode process (Embodiment 1)

FIGS. 3A and 3B show the operation of the parallel decode process by the first and second decoders 5 and 6. Shown in FIG. 3A are streams (frame rows) which are respectively supplied to the first and second decoders 5 and 6 by the stream dividing module 2. Each timing (temporal position) at which a frame is decoded is shown there. FIG. 3B shows how reference images are stored in the two areas of the reference frame memory 7.

The stream dividing module 2 divides the input stream (FIG. 2A) into frames and supplies them to the decoders 5 and 6. In this division, the end of each picture is identified by searting for a specific bit row (picture head code) inserted between pictures in the stream. Then, the present embodiment supplies pictures alternately to the decoders 5 and 6.

Therefore, a row of even frames (I0, B2, P4, ... ) and a row of odd frames (I1, B3, B5, ... ) are respectively supplied to the decoders 5 and 6 as shown in FIG. 3A. Decoding by the decoders 5 and 6 are done in this order. When decoding a P or B picture, however, one or two reference images are needed. In this case, the timing control module 8 does not allow the stream buffer 3 or 4 to supply the picture to the decoder 5 or 6 until the one ore two pertinent reference images are decoded completely. Thus, waiting periods U0, U1, U2 ... are added in the supplied frame rows.

FIG. 3B shows how reference images are stored. For example, I0 stored in region 1 is referred to when the subsequent P1, B2 and B3 are decoded. Therefore, I0 is held in region 1 until they are completely decoded. P1 stored in region 2 is referred to when the subsequent B2, B3, P4, B5 and B6 are decoded. Therefore, I1 is held in region 2 until they are completely decoded. Each reference image which is no longer referred to is replaced by the next reference image.

Immediately after the reference images needed to decode a frame are stored, the timing control module 8 instructs the decoder 5 or 6 to start processing. In the case of the I0 picture, an instruction to start processing is immediately issued unless the decoder is not ready since the picture can be decoded solely. In the case of the P1, a start instruction is issued after the decoded I0 is completely stored in region 1 since I0 is used as a reference image. In the case of B2 and B3, a start instruction is issued to both decoders after the reference images I0 and P1 are decoded and stored. Thus, timing control is done so that decoding of P1 is started after I0 is completely decoded and decoding of B2 and B3 is started after P1 is completely decoded.

The aforementioned control allows continuous decode processing without losing relations needed to refer to images. In addition, since each of the decoders 5 and 6 does not refer to an image being decoded in the other decoder, they can perform decode processing concurrently. It is therefore possible to raise the throughput and shorten the total decode time. As compared with a system where frames are sequentially processed one by one, the present embodiment can reduce the decode time to ¾ (4/3 in speed) by concurrently executing two adjacent B pictures, for example B2 and B3 and B5 and B6.

Embodiment 2

The following describes a second decode processing embodiment in the image decoder 100 of FIG. 1.

Figure 4:
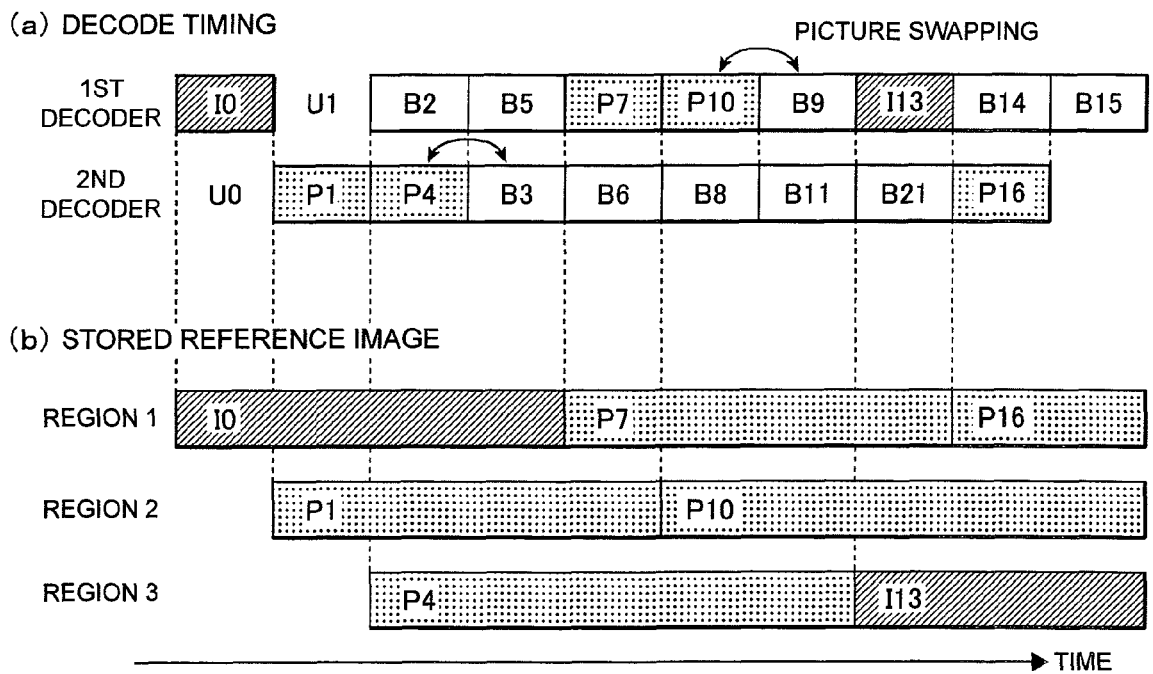
FIGS. 4A and 4B show the operation of a parallel decode process (Embodiment 2)

FIGS. 4A and 4B show the operation of a parallel decode process by the first and second decoders 5 and 6.

FIG. 4A shows when decoding is done by the decoders 5 and 6. FIG. 4B shows how reference images are stored.

In the present embodiment, the order of frames supplied to the decoders 5 and 6 from the stream dividing module 2 via the stream buffers 3 and 4 is modified. Specifically, the present embodiment analyzes the order of pictures in the input stream and modifies the order of pictures before supplying them so that pictures to be used as reference images are decoded in advance. This reduces wait periods Us during which decode cannot be started until reference images are decoded.

In the aforementioned embodiment 1, since decoding pictures B5 and 6 involves referring to P1 and P4, the second decoder 6 can not start decoding B5 until P4 is completely decoded (wait period U2) as shown in FIG. 3A.

In the case of the present embodiment, since B3 and P4 are swapped before supplied, P4 is decoded in advance. That is, P4 which is to be referred to is decoded before B3 which is not to be referred to. After decoded, P4 is held as a reference image together with P1. For this purpose, the reference frame memory 7 is extended to have three storage regions as shown in FIG. 3B. This makes it possible to immediately decode B5 and eliminates wait period U2 which is otherwise needed to wait until the reference image P4 is completely decoded. Likewise, wait periods U3, U4 and U5 in FIG. 3A are eliminated. In a steady state, wait periods can be eliminated at all.

Therefore, as compared with a system where frames are sequentially decoded one by one, the present embodiment can double the throughput. Thus, the processing efficiency is yet 50% higher than the aforementioned embodiment 1 (FIGS. 3A and 3B) with almost the same circuit configuration.

Embodiment 3

Further, the following describes a third decode processing embodiment in the image decoder 100 of FIG. 1.

Figure 5:
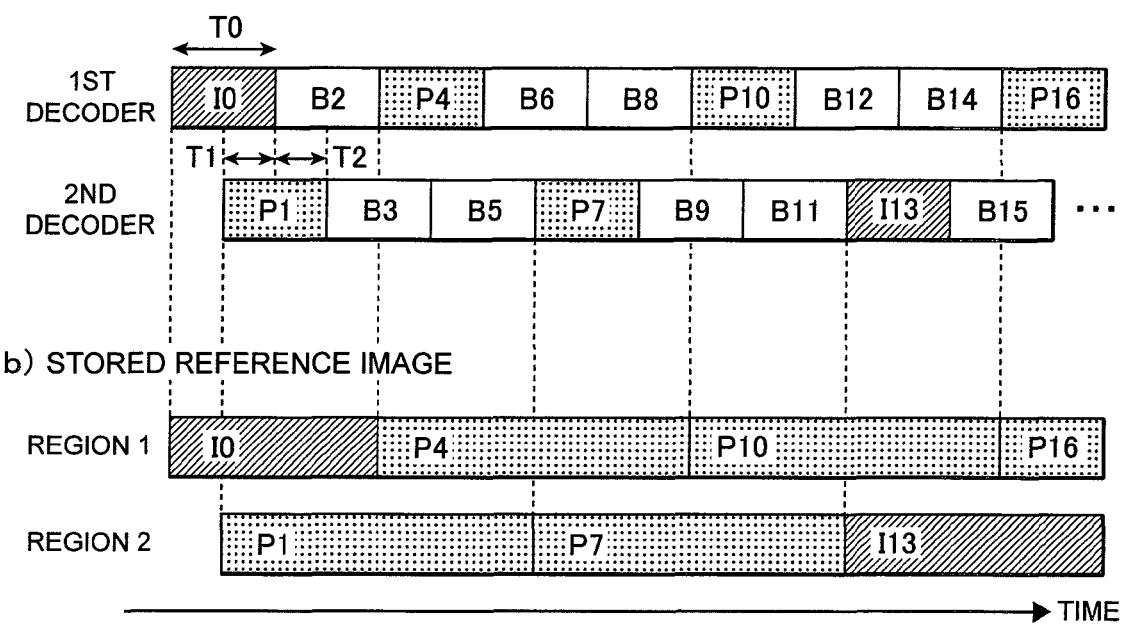
FIGS. 5A and 5B show the operation of a parallel decode process (Embodiment 3).

FIGS. 5A and 5B show the operation of a parallel decode process by the first and second decoders 5 and 6. FIG. 5A shows when decoding is done by the decoders 5 and 6. FIG. 5B shows how reference images are stored.

In the present embodiment, decode start timings are changed by shifting the timings of supplying frames to the decoders 5 and 6 from the stream dividing module 2 via the stream buffers 3 and 4 are shifted is modified. Specifically, the present embodiment analyzes the order of pictures in the input stream and shifts the stream supply timing (decode start timing) by T so as to eliminate wait periods Us during which decode cannot be started until reference images are decoded. Allocation to the streams is alternate as in the aforementioned embodiment 1 (FIGS. 3A and 3B).

In the aforementioned embodiment 1 as shown in FIG. 3A, since decoding of picture P1 involves referring to the reference image I0, the second decoder 6 must wait before starting the decode processing until I0 is completely decoded as shown in FIG. 3A. This wait period U0, imposed before the decode processing is started, is determined on the assumption that each MB (macro block) of each picture to be decoded refers to data in all regions of the reference image.

Usually, however, the MB region in the reference image to be referred to by each MB is often limited to a motion compensation region of several ten pixels by several ten pixels around the MB. Although dependent on the encoding scheme, this intends to reduce the scale (cost) of the motion detection circuit by limiting the encoded motion vector to as small a range as practically possible. Therefore, decoding of each MB can be started if the region around the same MB in the reference image to be referred to for motion compensation is already decoded. If this limited motion detection range is known in advance, decoding of P1 can be started freely with reference to the reference image I0 before I0 is completely decoded. Thus, the I0 decoding period may be overlapped partially with the P1 decoding period. This overlap period or the shift T1 of the P1 decode start timing may be determined according to the limited motion detection range. The smaller the limited range is, the larger the shift T may be set. By setting the shift T1, it is possible to remarkably reduces the wait period U0 to T1.

As well, decoding of B2 is started with reference to P1 before P1 is completely decoded. The shift T2 is also set as mentioned above. However, since the I0 decoding can not be overlapped with the B2 decoding, the T2 value is set in coordination with the T1 value. If the shift T1 or T2 is not smaller than the half of one picture decode time T0, it is possible to continuously execute the respective pictures without any wait period as shown in FIG. 5A.

Therefore, as compared with a system where frames are sequentially decoded one by one, the present embodiment can double the throughput. Thus, the processing efficiency is yet 50% higher than the aforementioned embodiment 1 (FIGS. 3A and 3B) with almost the same circuit configuration. In addition, not like in the aforementioned embodiment 2 (FIGS. 4A and 4B), the order of frames in the stream is not modified and only two reference images are held at a time, resulting in a simple circuit configuration.

Further, in the present embodiment, decoding of the P1 picture can be completed faster than in the aforementioned embodiment 1 and embodiment 2. Since the delay time due to decode processing can be shortened, this scheme is preferable when the decoded image output rate must be higher than the normal real time image rate.

Although the input stream is divided between two decoders in any of the embodiments described so far, it is also possible to divide the input stream among three or more decoders. For example, in the case of three decoders, the separated frames are cyclically supplied to the three decoders. This allows the three decoders to concurrently decode frames which do not involve reference to another decoder, further shortening the decoding time.

The decoders used in the aforementioned embodiments can be implemented by common decoder functions. It is therefore possible to construct inexpensive and high speed processing image decoders of the present invention by using existing mass-produced decoder Large Scale Integrations (LSIs). Alternatively, it is also easy to implement such decoder circuits on a PC by connecting a software processing processor, Dynamic Random Access Memory (DRAM) memory and the like via a common bus.

Although each of the aformentioned embodiments is provided with a plurality of stream buffers, it is also possible to sequentially store frames in a single stream buffer. In this case, the image decoder may be configured such that the stream dividing module designates a read pointer to each decoder and each decoder reads out a frame according to the lead pointer which indicates the location of the frame in the stream buffer.

While we have shown and described several embodiments in accordance with our invention, it should be understood that disclosed embodiments are susceptible of changes and modifications without departing form the scope of the invention. Therefore, we do not intend to be bound by the details shown and described herein but intend to cover all such changes and modifications that fall within the ambit of the appended claims.

In the above embodiments each elements at least expressed as "module" can be realized by a hardware or a software or both to achieve the function and the operation explained in the part.

What is claimed is:

1. An image decoder which decodes an encoded video stream and outputs the decoded images, comprising:
   a stream dividing module by which an input video stream is divided in units of frames as a plurality of frame rows for distribution;
   a plurality of decoders each of which generates decoded images by decoding a frame row distributed from the stream dividing module;
   a reference image frame memory where of the decoded images generated by the plural decoders, reference images to be referred to when a subsequent frame is decoded is stored;
   a display image frame memory where the decoded images generated by the plural decoders are accumulated;
   an image display output module which outputs the decoded images from the display image frame memory in the order that the images are displayed; and
   a timing control module which receives information about stream distribution from the stream dividing module and controls the respective timings of decoding frames distributed to the plural decoders;
   wherein the timing control module provides timing control so that decoding of a distributed frame is started immediately after the reference image to be referred to by the distributed frame is partly stored in the reference image frame memory.

2. The image decoder according to claim 1, wherein the stream dividing module distributes divided frames cyclically and sequentially to the plural decoders.

3. The image decoder according to claim 1, wherein the stream dividing module modifies the order of divided frames before distributing the divided frames to the plural decoders so that frames to be used as reference images are received earlier than frames not to be used as reference images.

* * * * *